Patented Aug. 8, 1933

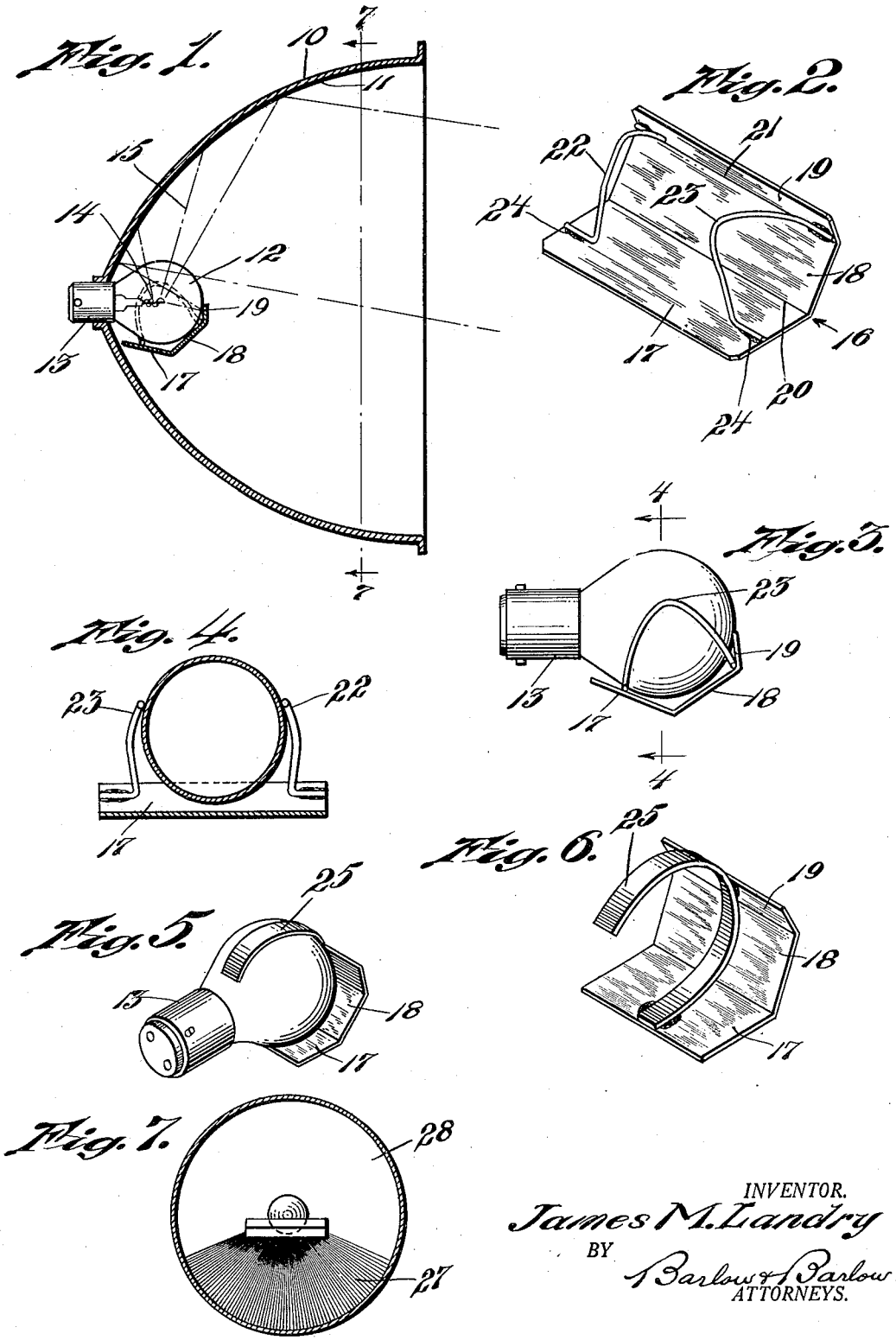

1,920,992

UNITED STATES PATENT OFFICE 1,920,992

HEADLIGHT SHIELD

James M. Landry, Pawtucket, R. I.

Application February 9, 1932. Serial No. 591,791

1 Claim. (Cl. 240—48.6)

This invention relates to a device for controlling the direction of light rays from an incandescent lamp, and has for one of its objects to provide a construction which may be used upon the lamp of a headlight such as are provided on automobiles to control the light rays therefrom and prevent the rays from being projected upwardly into the eyes of an approaching pedestrian or driver of another vehicle.

Another object of this invention is the provision of a construction which may be easily attached to the lamp and detached therefrom for interchanging the shield from one lamp to another, should the lamp upon which it is used burn out and be desired to be replaced.

Another object of the invention is the provision of a construction which may be readily changed in width to control the width of the beam of light rays to be diverted.

Another object of the invention is the provision of a retaining device for gripping the lamp which will maintain the shield or body portion of the device in the desired position, notwithstanding the jars and vibrations to which the same may be subjected in use.

A further object of the invention is the provision of a structure which may be mounted on the lamp prior to its assembly in the headlight and be assembled therewith or detached and removed with the lamp or bulb when the latter is removed from mounted position.

A still further object of the invention is the provision of a shield which will be simple in its construction and inexpensive to manufacture.

With these and other objects in view, the invention consists of certain novel features of construction, as will be more fully described, and particularly pointed out in the appended claim.

In the accompanying drawing:

Fig. 1 is a sectional view of a headlight showing the lamp and my light rays controlling device mounted thereon.

Fig. 2 is a perspective view of the device detached from the lamp.

Fig. 3 is a side elevation of the lamp with the device attached thereto.

Fig. 4 is a sectional view on line 4—4 of Fig. 3.

Fig. 5 is a perspective view of a device mounted on the lamp by a modified holding means.

Fig. 6 is a perspective view of the modified form of the device alone.

Fig. 7 is a section on line 7—7 of Fig. 1 largely diagrammatic and illustrating the darkened sector of the reflector.

It is frequently experienced that an approaching vehicle equipped with headlights will reflect a portion of the light from the lamp into the eyes of the driver of another vehicle or the eyes of a pedestrian toward which said vehicle is moving, which is frequently termed "glare" from the headlights. This glare is due to the upwardly directed rays of light caused by the reflection of beams of light from the lamp which strikes the lower portion of the reflector by being directed downwardly and then being reflected upwardly, and in order to govern and control and to some measure prevent light from impinging upon the portion of the reflector which will direct them upwardly; and to do this I have provided a device which may be easily mounted upon the lamp itself and may be removed when the lamp is removed from the headlight or its reflector mounting; and the following is a detailed description of the present embodiment of this invention illustrating the preferred means by which these advantageous results may be accomplished.

With reference to the drawing, 10 designates a headlight having a reflector 11, a section of which is generally in the shape of a parabolic curve, 12 designates a bulbous lamp having a base portion 13 to fit within a suitable socket associated with the casing and provided with a suitable envelope about a filament 14 which is heated to incandescent temperature to emit light therefrom, certain rays of which on the upper half of the headlight are designated by the dot dash lines 15, the same being shown as being reflected from the inner surface or reflector of the casing at an angle, and from which it will be observed the rays take a generally downwardly directed path after reflection. Conversely, from the lower half of the reflector the corresponding rays would be similarly reflected only the rays which are downwardly directed in Figure 1, as shown by the lines 15, would be upwardly directed from the lower half of the lamp if uninterrupted, and in order to prevent such upward reflection I have provided a device consisting of a body portion 16 composed of three sections 17, 18 and 19, each of sheet stock, and substantially in a single plane with the sections, meeting along a definite line 20 and 21 so that along this line the angle between the adjacent sections 17 and 18 and 19 will be an obtuse angle.

By this arrangement of the body the same fits generally about the curvature of the envelope of the bulbous lamp 12 and permits the laterally directed rays from the lamp to be unobstructed in their path of travel toward the sides of the reflector of the headlight, and of course does not interfere with the upward rays of light but interrupts only the downwardly directed rays or those which may be reflected upwardly to cause the glare or annoyance to the approached or approaching vehicle driver or pedestrian.

These flat surfaces of the sections of this device are highly polished and reflect the rays of light from the lamp which are directed thereagainst.

In order to detachably secure the device in desired position I have provided a pair of U shaped arms 22 and 23 with the ends 24 of the U bent and secured along convenient portions of the surface of the different sections by solder or suitable means, thus providing a bent wire portion between which the lamp is clamped to secure the shield of the device in position. This length of the sides of the U arms is such as to permit the curved bight or portion between the legs to extend sufficiently to pass the center of the bulb and draw the shield or body up against the lamp, as illustrated in Figures 1 and 4, whereby to securely hold it in position against rattling loose or moving to a different position by jars or the like.

By this arrangement none of the upwardly direct rays of light which are subsequently downwardly directed are interfered with while the laterally projected rays of light are but slightly interfered with by the diameter of the retaining wire.

In some instances it is desirable to provide a single arm which may take the form of a band 25, as illustrated in Fig. 5 in the modification, which extends along and follows generally the direction of the body and extends sufficiently about the lamp to securely grasp the same and hold the device in position, as illustrated in Figures 5 and 6.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

The combination with a concave reflector, a light bulb supported by said reflector at its center, of a device for controlling the direction of the rays from the bulb, said device comprising a member having three plane portions adapted to underlie the bottom of the bulb to reflect all rays from the lower portion of the bulb to the upper portion of the concave reflector, the planes being at angles with each other, the first plane extending downwardly and forwardly below the front forward portion of the bulb, the second plane extending downwardly and backwardly below the lower front half of the bulb, and the third plane extending backwardly and upwardly below the lower back half of the bulb, the sides of the bulb being left uncovered, and means for resiliently attaching said controlling device to the bulb, said last mentioned means comprising U-shaped loops having legs secured to opposite plane portions of the controlling device, whereby the said loops may grip the bulb along opposite sides of the longitudinal axis thereof.

JAMES M. LANDRY.